United States Patent [19]

Benhase et al.

[11] Patent Number: 5,535,372
[45] Date of Patent: Jul. 9, 1996

[54] METHOD AND APPARATUS FOR EFFICIENT UPDATING OF CKD DATA STORED ON FIXED BLOCK ARCHITECTURE DEVICES

[75] Inventors: Michael T. Benhase; David A. Burton; John N. McCauley, Jr.; Robert L. Morton, all of Tucson, Ariz.

[73] Assignee: International Business Machines Corporation, Armonk, N.Y.

[21] Appl. No.: 271,335

[22] Filed: Jul. 6, 1994

[51] Int. Cl.⁶ ................................................. G11B 5/09
[52] U.S. Cl. ........................... 395/500; 360/48; 395/427
[58] Field of Search ........................ 360/48; 395/500, 395/425, 800

[56] References Cited

U.S. PATENT DOCUMENTS

| | | | |
|---|---|---|---|
| 4,603,380 | 7/1986 | Easton et al. | 364/200 |
| 4,636,946 | 1/1987 | Hartung et al. | 364/200 |
| 4,956,803 | 9/1990 | Tayler et al. | 364/900 |
| 5,146,576 | 9/1992 | Beardsley et al. | 395/425 |
| 5,155,835 | 10/1992 | Belsan | 395/425 |
| 5,155,845 | 10/1992 | Beal et al. | 395/575 |
| 5,202,799 | 4/1993 | Hetzler et al. | 360/48 |
| 5,206,939 | 4/1993 | Yanai et al. | 395/400 |
| 5,235,690 | 8/1993 | Beardsley et al. | 395/425 |
| 5,235,692 | 8/1993 | Ayres et al. | 395/425 |
| 5,283,884 | 2/1994 | Menon et al. | 395/425 |
| 5,301,304 | 4/1994 | Menon | 395/500 |
| 5,388,013 | 2/1995 | Nakamura | 360/48 |
| 5,394,532 | 2/1995 | Belsan | 395/425 |
| 5,394,534 | 2/1995 | Kulakowski et al. | 395/425 |
| 5,428,802 | 6/1995 | Anglin et al. | 395/800 |

Primary Examiner—Kevin J. Teska
Assistant Examiner—Russell W. Frejd
Attorney, Agent, or Firm—Baker, Maxham, Jester & Meador

[57] ABSTRACT

A method and apparatus for updating CKD data stored on fixed block media, and more particularly to creating Track Format Descriptors which are data structures loaded into electronic memory to enable fast writing of data without loading an entire CKD emulated track of data into memory. A control unit is provided with logic to provide Track Format Descriptors which describe the format of the track without the need for the data content of the track to be resident in cache, or electronic memory. An emulated CKD volume corresponds to a volume of data stored on a multi-disk device. Each track on a volume is represented by a Track Format Descriptor. The Track Format Descriptor forms a representation of the format according to the following general procedure. If the format is a predefined format, in other words one that is already known by the control unit then a track form descriptor is formed to represent the format. If the format is easily discernible, it is said to be "well behaved". "Well behaved" formats are ones in which either each record has the same field length, there is no key field, or record numbers start at one and increment by one. A Track Format Descriptor is formed by predicting the format of these so called "well behaved" formats. If the format is not "well behaved" and the format has not been predefined, then the entire data track must be loaded into cache memory, before a fast write operation is performed. The Track Format Descriptor serves as an index to other information data structures which are loaded into memory when required by logic in the control unit.

39 Claims, 8 Drawing Sheets

FIG. 2 CKD TRACK FORMAT (Prior Art)

METHOD AND APPARATUS FOR EFFICIENT UPDATING OF CKD DATA STORED ON FIXED BLOCK ARCHITECTURE DEVICES

BACKGROUND OF THE INVENTION

1. Field of the Invention

The present invention relates to a method and apparatus for efficiently updating data stored on fixed block media, and more particularly to creating data structures to describe the format of emulated CKD data tracks, which are loaded into electronic memory to enable fast writing of data and locating of data without loading an entire track of data into memory.

2. Description of the Related Art

Disk storage systems such as those used with mainframe computer systems, also called host systems, such as the IBM 390, often utilize many disk drives. The present invention is useful for updating data stored on such disk drives, such as the IBM 3380 and 3390 disk drives. These type disk devices, commonly know as Direct Access Storage Devices (DASD) must communicate with host programs that are based on the IBM 360/370 architecture, which has been in place since the 1960's and early 1970's. This means that the older data formats for DASD must be emulated in order for the host to recognize the storage devices. Typically, this means that newer and more efficient, higher-capacity drives, such as those using the Small Computer System Interface (SCSI) and which work with fixed block architecture (FBA), must be provided with emulation software in a device controller to communicate to a host, such as an IBM 390, without inducing error states.

DASD requires certain Input/Output functions in order to serve its function as permanent data storage for the host. An I/O channel typically connects the DASD and the host processor. The host processor operating system initiates data transfer with a command to the I/O channel. This is done by a series of Channel Command Words (CCW's) which are forwarded to a DASD controller. The controller interprets the CCW's and commands the DASD to execute the commands. For example a "SEEK" command positions a DASD access mechanism, "SEARCH" commands cause comparison between data sought by the host and data physically stored on the device, a "WRITE" command transfers data from the host to the DASD, and a "READ" command copies data from DASD to the host where it is checked for validity.

DASD devices typically store data on a track, which is a circular path on the surface of a disk on which information is recorded and from which recorded information is read. Typically these disk drives implement a COUNT, KEY, and DATA (CKD) format on the disk drives. For a detailed explanation of CKD architecture, see for example, Marilyn Boyl, *Introduction to IBM Direct Access Storage Devices,* Science Research Associates Inc., 1981. The format contains a definition of how data is structured in the records contained on the track. A record is a set of one or more related data items grouped together for processing, such that the group may be treated as a unit. Disk drives utilizing the CKD format have a special "address mark" on each track that signifies the beginning of a record on the track. After the address mark is a three-part record beginning with the COUNT field which serves as the record ID and also indicates the lengths of the optional KEY field and the DATA field, both of which follow. Also on the track, there is :normally one Home Address (HA) that defines the physical location of the track and the condition of the track. The HA typically contains the physical track address, a track condition flag, a cylinder number (CC) and a head number (HH). The combination of the cylinder number and the head number indicates the track address, commonly expressed in the form CCHH. The HA contains the "physical track address" which is distinguished from a "logical track address". Some operating systems, such as the IBM Virtual Machine (VM) operating system, employ a concept of "virtual disks" referred to as user mini-disks, and thus it is necessary to employ logical addresses for the cylinders rather than physical addresses. The first record following the HA is commonly a track descriptor record, sometimes referred to as Record 0, or R0. One or more user records follow R0 on the track. The R0 record contains no key field, but may contain either system or user data. The first part of each user record is an "address marker" that enables the controller to locate the beginning of the record when reading data.

Typically, the I/O channel is used by the host to communicate to the controller, the device and track of interest. The channel may also specify the rotational position on the track from which to begin searching for the record having the data field to be read or written. The I/O channel is typically placed in a wait state until the mechanical action of locating the specified track rotational position is complete. The searching may be accomplished in the IBM mainframe environment by specifying a SEARCH parameter. The parameter is typically a five byte field containing two bytes designating a cylinder number (CC), two bytes designating a head number (HH), and one byte designating the record number (R). Using such a DASD device, a physical search of each record on the track designated by the CCHH address is required to locate the record of interest. The SEARCH command is repeatedly issued until the record is located, thus tying up the I/O channel. One skilled in the art can readily appreciate the inherent disadvantage of having the I/O channel unavailable for other tasks while the search and locate process takes place. Thus, the prior art is replete with techniques for reducing such wait states. For example, U.S. Pat. No. 4,603,380 to Easton et al. discloses a method for reducing the volume of database transfers between DASD and cache.

Some DASD controllers known in the art, such as the IBM 3990 DASD controller, have some amount of fast electronic cache memory for storing records that have been written by the host system but not yet: written to the DASD medium by the DASD controller. Such cache is typically of the Non-Volatile Store type, making it less susceptible to data loss due to an interruption of power. Such DASD controllers are capable of performing a "fast write" operation. A "fast write" operation allows the host to write data to the cache and disconnect it from the controller before data is written to disk. In this way the I/O channel is free for other host activities with other devices, including other DASD. In U.S. Pat. No. 4,875,155, to Iskiyan et al., a cache and a DASD buffer store: for use with CKD records staged into electronic memory is disclosed to enable a "fast write" capability. Unfortunately, this patent teaches staging the entire data record from DASD into cache, which takes up considerable space in expensive high speed memory.

Since CKD records may have variable data lengths, the format of a particular track must be known before a "fast write" may occur. In particular, the key and data length information is contained in the COUNT field of the CKD format. Additionally, the number of records on a particular track must also be known before a "fast write" occurs. This is because a track may contain only a maximum number of records. An attempt to "fast write" a record to a track which has no space available must be flagged as an error. Further, an additional function of the format is to determine the validity of each write operation. The control unit uses the format information to signal error conditions such as "no record found", and "invalid track format". In order to accomplish this result, prior art control units required the entire track of data to be resident in cache. This meant the entire data track had to be loaded or staged in cache memory. Only in this way, was it possible to determine the format of the track. Unfortunately, the drawback of this method, as in the '155 patent, is that valuable cache memory space is taken up by the entire data track, and the associate mechanical lag time of rotating the disk and moving the read/write heads forces the I/O channel into a wait state.

Fixed block architecture (FBA) devices while having similar physical characteristics to CKD formatted devices, store and address the data, differently. In fixed block devices, the data is typically stored in blocks having equal lengths. Regarding terminology, these blocks are referred to as sectors; however, in the DASD convention, the term "sector" typically refers to a pie-shaped section of the physical disk medium. Thus, the definition of sector will depend on the context of its use. The data is addressed according to the address of the physical sector in which it is stored in an FBA device. In this way, the data may be addressed without the need for a physical search of the device to locate the record. Because of the fixed length of data sectors and the addressing scheme, FBA devices have much higher capacity and better performance than CKD formatted devices. Thus, such FBA devices have gained significant popularity in the computer industry. Unfortunately, as mentioned in the beginning of this background description, the host operating systems and their application programs that are descendants of IBM 360/370 architecture are programmed to expect to locate a data record for reading and writing by physically searching a disk medium according to CKD format. Accordingly, there have been developed techniques for emulating CKD format on FBA devices that are well known in the art.

U.S. Pat. No. 5,206,939 to Yanai et al. discloses a technique for converting CKD formatted records for use with FBA disk drives. This patent discloses a compression technique for representing the COUNT field of every record of CKD formatted data. The disclosed technique requires storing the COUNT field of the first record of a track, and then depending on the relationship of the next COUNT field to the first, storing one or more codes to represent that which has changed from each record to the next succeeding record. The '939 patent discloses allocating 128 bytes for each track to accomplish the index locating of stored information. Unfortunately, this can amount to a rather significant amount of storage in high speed electronic memory, when the number of tracks is accounted for and the number of devices for which this track related information is stored is also accounted for. For example, in a IBM 3390 model 3 (3390-3) which has multiple disk platters arranged in a stacked fashion for housing a plurality of disk mediums, which may each have two surfaces accessed by a plurality of heads mounted on respective actuator arms, there are approximately 50,000 tracks. A typical environment of multiple IBM 3390 disk drives attached to one DASD controller, such as an IBM 3990 controller, has a maximum 64 devices. Thus, this yields 3.2 million tracks which must be accounted for, and at 128 bytes per track this comes to 409.6 million bytes (409.6 megabytes) of information which must be stored in expensive high speed electronic cache memory. Additionally, the compression technique of the '939 patent only works if the track related information does not exceed the maximum storage allotment of about 128 bytes. If this condition is not met, then the entire track must be loaded from disk into cache. Thus, if the disk had been formatted, for example, by VM with minidisks, then the changes in each COUNT field due to the use of logical addressing schemes would easily exceed the maximum allotment. In that case, the entire track would have to be loaded from disk before a "fast write" operation could occur.

Another patent that discloses methods useful for performing "fast writes" to an FBA device storing CKD formatted data is U.S. Pat. No. 5,283,884 to Menon et al., and assigned to the assignee of the present invention. This patent discloses a technique that is useful when the above described pattern (key length equal to zero, equal data lengths, a record number starting at R0 and incrementing by one) and additionally is capable of discerning other patterns. Unfortunately, this patent discloses storing a table entry in non-volatile memory which has an entry for each record. Each entry includes a compressed count field, including two bytes for the data length, two bytes for the CC number, and two bytes for the HH number. The patent discloses a technique for reducing the storage requirement by up to three bytes by storing a compacted version of the CCHH number by taking into account the number of tracks on a cylinder; however, this still requires a three byte entry per record on the track. In the worst case for an IBM 3390, there may be 86 records per track, thus the table for such a track would require 258 bytes of memory. Applying the same calculation from above for the IBM 3390, this would amount to (50,000 tracks per device)×(64 devices)×(258 bytes memory per track) or approximately 825.6 million bytes of memory to keep up with all the devices. Clearly, there is a long felt need for a method and/or apparatus to provide for a less costly way to keep up with CKD data records stored on FBA devices and which does not always require the also costly procedure of loading the respective records from disk to cache memory.

The performance of cache memory is characterized by "hit/miss" ratios. The terms "hit" and "miss" have different meanings according to their use in context of a read or write operation. A "hit" means that a read reference to the cache generated by a requesting CPU executable process locates the data item desired in cache, rather than in lower speed disk memory. A read operation "miss" is registered if the data is unavailable in cache memory. A "hit" with respect to a write operation is made when the CPU executable process through the cache manager finds a counterpart location in a partially full buffer to overwrite. A write operation "miss" occurs when an item must be destaged to make room for a write reference or if a track has to be staged to perform the write operation. Thus, it can be seen that the hit/miss ratio for write operations can be improved by providing track format information without having to load an entire data track into memory. Additionally, ratios for read operations may be improved if the track format information also allows for a record to be located without the need to physically search the disk.

International Business Machines Corporation (IBM), in its publication GC26-4519-0 available from IBM Publications as of January, 1990, describes extended COUNT KEY DATA (ECKD) commands. Such data-access commands are usable with the preferred embodiment of this invention, such as the command LOCATE RECORD. This IBM publication is cited as background information to fill out the discussion of the related art and to enable the practice of the invention. This IBM publication does not describe the machine-executed operation of the present invention which solves the above-mentioned problems related to writing or updating tracks of CKD data stored on fixed block architecture devices, without the requirement of having to load the entire data track into cache memory.

SUMMARY OF THE INVENTION

An objective of the present invention is to improve the performance of write operations by eliminating the need to stage an entire data track of CKD data stored on a fixed block device into cache memory in order to perform a write operation.

A further objective of the present invention is to meet the above objective without also requiring that a significant cost be exacted by having to store a large amount of data which describes the CKD data in cache memory.

A still further objective of the present invention is to improve the performance of cache memory used in conjunction with fixed block media storing CKD data, by improving the hit/miss ratio of cache in respect to a locate or write operation of a record.

These objectives are accomplished by a control unit which is adapted with logic to provide data structures denoted as track format descriptors which describe the format of an emulated CKD track stored on an FBA device. The control unit is in communication with a host, and is provided with electronic cache memory for data storage and transfer means for bilateral communication of data between the electronic memory and FBA device. The track format descriptor is created and loaded into cache or electronic memory so that a fast write operation may be performed without the need for the data content of the track to be resident in cache, or electronic memory. There are three benefits derived from this result. The first benefit is that there is no need to take up limited cache memory with an entire data content of a track. The second benefit is that a "fast write" operation can be accomplished for data tracks that are not resident in cache. A "fast write" occurs when the host writes update data to the cache and then disconnects from the control unit before data is written to disk. The third benefit is that a read operation can be satisfied without placing the I/O channel in a wait state by locating the desired record by using the track format descriptor.

In one embodiment, if the data is stored on disk in a predefined format, i.e., one already known to the control unit logic, then a track format descriptor is created based on the predefined format. In another embodiment, if the format is recognized by the logic to be "well behaved", i.e., having certain characteristics, then the track format descriptor is built according to the predictable pattern. "Well behaved" formats have the following characteristics, each record has the same data field length, there is no key field, record numbers start at ordinal number one and increment by one. If the format does not meet either predefined or "well behaved" criteria then the entire track is loaded into cache.

DETAILED DESCRIPTION OF THE PREFERRED EMBODIMENTS

Figure 1:
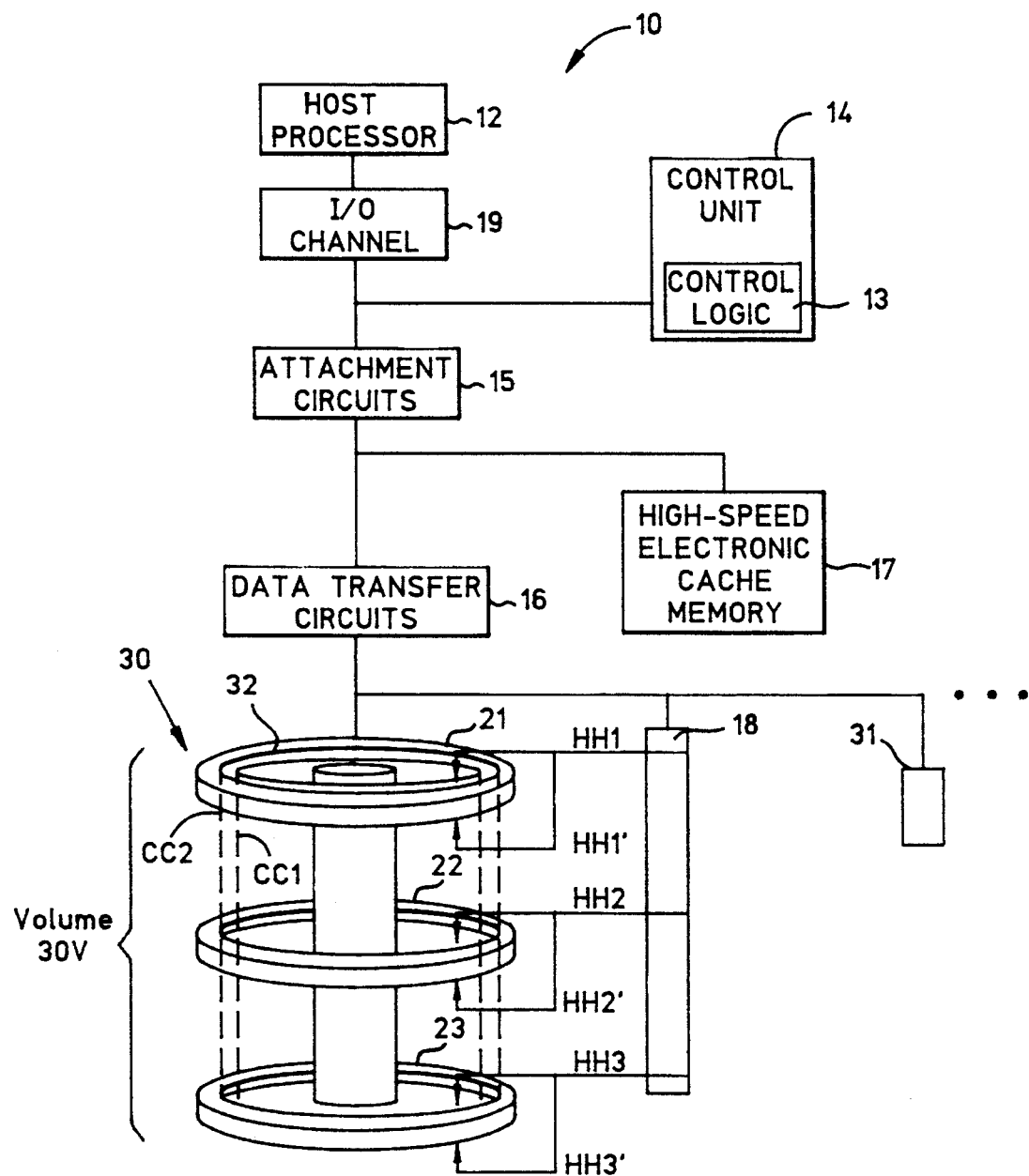
FIG. 1 is a simplified block diagram showing a disk storage device connected to a host processor, an I/O channel, electronic cache memory, and a control unit for a system in which the present invention is employed.

Referring to FIG. 1, a network 10 comprising a host processor 12, such as an IBM 390 is attached to a control unit 14, through Input/Output (I/O) Channel 19. Channel 19 manages the control unit 14 by passing on commands from the host, in the form of Channel Command Words (CCW's). In the illustrated example of FIG. 1, the control unit 14 has the task of communicating jobs and messages from the host 10 to a disk storage device 30. The control unit may be for example a IBM 3990 controller adapted with logic 13, which enables the methods of the present invention. The logic 13 may be implemented in hardware or software, and the preferred embodiment is discussed below. The device 30 comprises a plurality of disks 21, 22, and 23, which are all controlled by the control unit 14. The device 30 further comprises an actuator 18 with heads, HH1, HH1', HH2, HH2', HH3 and HH3' for reading and writing data on each surface of disks 21, 22, and 23. The device 30 is a fixed block architecture (FBA) device, however, logic 13 allows it to emulate a CKD device such as an IBM 3380 or 3390 disk drive. Because the FBA device will be emulated to host 12 as a CKD device, the device is shown with a data track 32 which is actually a CKD emulated track, in order to explain the concept of important CKD terminology. Herein, the term track refers to a CKD emulated track. Data transfer circuits 16 and attachment circuits 15 serve to allow for bilateral transfer of commands and data between the host processor 12, control unit 14, and storage device 30. Such data transfer and attachment circuits may be provided to comply with a known small computer system interface (SCSI). Electronic high speed memory, known as cache memory 17 is also attached to the host 12 and the control unit 14 through the attachment circuits. The cache memory 17 is illustrated as a single entity for the sake of simplicity; however, the cache memory may be part of a separate computer or distributed.

It will be appreciated that many storage devices, such as device 30, may be attached to host 12, and an element 31 is shown to represent one of such of a plurality of disk drives, and a serial line of dots indicates that other such storage devices may be attached. In a typical data storage environment, up to 64 devices, such as device 30, may be attached to a DASD controller, such as control unit 14. There are a great number of tracks in such an environment, and this makes the low storage requirements of the present invention particularly advantageous. A single IBM 3390, for example, has up to 50,000 tracks and over 64 such devices, producing about 3.2 Million tracks of data. Cache memory, such as memory 17, is generally arranged in fixed block sizes. A typical track is also a fixed size, but single records are not. Therefore, a conventional practice is to stage an entire track into cache, in order to perform a read or write operation. This is undesirable, it terms of taking up valuable space in memory and because of the associated lag time due to searching for records on disk. However, while it is disadvantageous to load an entire data track into cache, it is also disadvantageous to consume more expensive electronic high speed memory than is necessary to describe the format of a track of data. The inventors solution to avoiding placing an entire data track into cache, in order to accomplish a "fast write" operation or locate a record, also observes the need to minimize the use of cache memory. Thus, the inventors solution is a data structure created to describe each track of data requiring only 4 bytes of memory for each track.

Referring again to FIG. 1, a volume 30v is shown spanning several cylinders. Regarding terminology, the term volume has different meanings within the permanent storage art. In the CKD architecture, the data stored on a hard drive is referred to as a volume. Sometimes, the disks mounted on the hard drive itself are referred to as a volume. In this description, the former definition is preferred. Thus, volume 30v equates to the entire volume of data stored on disk 21, disk 22, and disk 23. The volume 30v is actually an emulated CKD volume to host 12. Herein, the term volume is used to refer to an emulated CKD volume. Each track on a volume is represented by a Track Format Descriptor. Each track has a two level physical address. The address may be referred to as being in CC HH format, where CC represents a 16-bit binary cylinder number and HH represents a 16-bit binary read/write head number. In the illustrative example of FIG. 1, there is a respective head, HH1, HH1', HH2, HH2', HH3 and HH3' for each surface of a disk, disk 21, 22, and 23. In a typical disk drive, there would be a plurality of heads on each surface of a disk; however, for ease of explanation the example has been simplified. Two cylinders defined by nominal circumference and denoted by CC2 and CC1 are also shown in FIG. 1. An exemplary track 32 is located by the address, CC1 and HH3. An actuator 18 moves each respective head to its matching corresponding disk. The actuator may be a linear actuator such as the type employed in the IBM 3380, or a rotary actuator as described in C. Denis Mee and Eric P. Daniel, *Magnetic Recording,* Vol. II Data Storage, Chap. 2, 1986. Additionally, addressing may be done with more resolution in the form of CCHHR, where R denotes a particular record (not shown) on a track addressed by the specific CCHH address.

CKD Format and FBA Emulation

Figure 2:
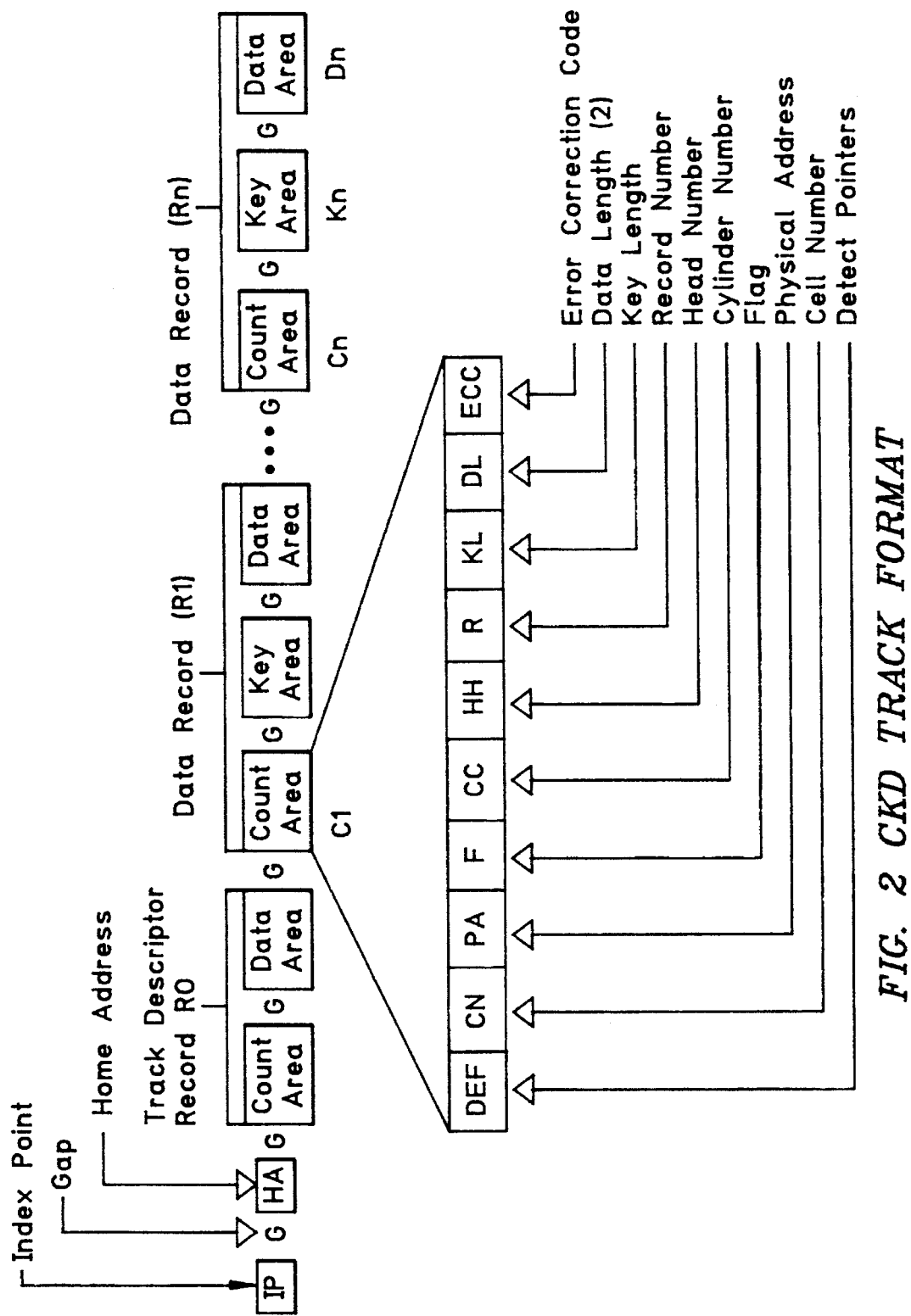
FIG. 2 is a schematic representation of a CKD data format useful with the present invention.

Referring to FIG. 2, a schematic of well-known CKD format is shown. Numbers are not used to refer to the elements of the figure, since each field is clearly labeled, and thus none are needed. The CKD format is described in detail in the above-cited '884 patent application. A CKD disk format differs from a fixed block disk format in that the CKD format allows for the storage of variable-length records and for the storage of keys separately from data. The key field which is optional is typically used for sorting records. It is used less frequently by modern database programs that use methods other than the key field for sorting. The single CKD track in FIG. 2 consists of an starting point referred to as an index point (IP), followed by a brief physical gap (G) to indicate a break between fields, followed by a home address (HA) field, and data records R0 through Rn, each separated from the other by a gap, G. The HA field contents usually include cylinder and head numbers which are designated the "logical" cylinder and head location of the track. Each data record, Ri, consists of at least one COUNT (Ci) field, one variable length data (Di) field and optionally one key (Ki) field. All data records and fields are separated by gaps (G) of varying lengths depending on the fields they are between (i.e. index and HA, HA and COUNT, COUNT and key, etc.). Each COUNT field contains subfields including defect pointers (DEF), cell number (CN), physical address (PA), flag (F), cylinder number (CC) which is two bytes, head number (HH) which is also two bytes, record number (R), key length (KL), data length (DL) which is also two bytes, and an error correction cocle (ECC).

CKD Data Stored on FBA Devices

Techniques for converting CKD format data to FBA format are well known in the art. It is well known that CKD architecture concepts, including CKD records, tracks, cylinders, and volumes must be emulated to the host, such as an IBM 390. Thus, the volume, cylinders, and tracks shown in FIG. 1 must be emulated to host 12 for data stored on an FBA device. It is known in the art, that it is only necessary to emulate the five bytes of data that identify the record, CCHHR, the two bytes describing the length of data field (DL), and the Key length (KL) since the other three bytes deal with the physical condition of the CKD disk medium and are unimportant in FBA emulation of CKD format. This is because the FBA device only requires the address of the block storing the data in order to locate the record, and therefore does not search the physical device to locate a record, thus the DEF, CN, PA, F, and ECC bytes are not typically needed from the COUNT KEY DATA field in order to perform emulation to the host 12. An exception to this rule is that the cell number, CN, is needed if the host specifies a CKD record by its angular position rather than its identifying record number, R. The cylinder number, head number and record number fields are collectively denominated as described above as CCHHR, which is the logical ID for the record. The CKD record must include this ID field, which may not be eliminated, but the cylinder and head numbers need not be identical to those in the physical address field. Thus, the record numbers of consecutive records on a physical track need not be consecutive nor need they be unique. However, it is generally the case that the PA field, which contains the "physical" cylinder and head location of the track, is identical to the HA field, as well as the CCHH field in the record COUNT field. Importantly, the inventors have recognized that since these fields are, in practice, overwhelmingly the same, a host request to "SEEK" with particular CCHH parameters can be used to construct a COUNT field for CKD emulation. Empirical evidence indicates this is true more than 90% of the time. Thus, the CCHH field need not be created in a Track Format Descriptor data structure which describes the format of a particular track. Instead, if it is ever needed, it may be loaded from disk, but it will rarely be needed by implementing the present invention. Thus, in accordance with the present invention, the CCHH information in a Host "SEEK" CCW command may be used to construct an emulated COUNT field for a CKD emulated track, and a data structure which describes the format of the data stored on the disk may be created following a Host "FORMAT WRITE" command in order to facilitate a fast write operation to disk and to more quickly locate a record.

Figure 3:
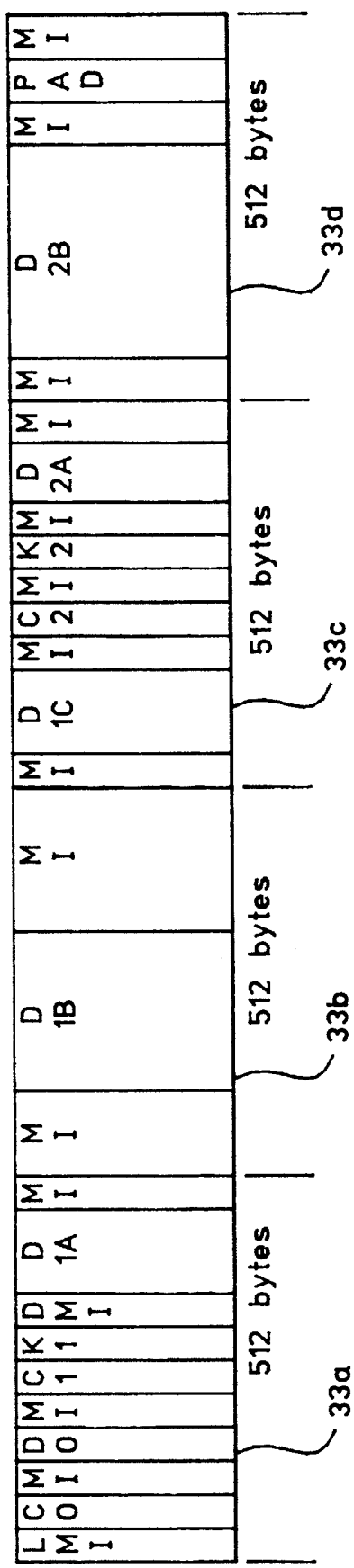
FIG. 3 is a schematic representation of CKD data stored on a fixed block device.

Referring to FIG. 3, CKD data stored on an FBA device is shown. There are various and well known ways to store CKD data on an FBA device. One way is to store in "Sector Mode Format". A typical sector on an FBA device,, is 512 bytes, and each sector is of equal length. Again, reference numerals are not used for the byte fields since each field is clearly labeled and thus they are not necessary. Sector 33a is shown broken into several fields, including C0, C1, for COUNT fields for record 0 and record 1, DO and D1A for data fields for record 0 and record 1, and K1 for a key field, for record 1. The data fields due to their length span more than one sector. Data management information bytes are included in every sector and labeled as MI. Sector 33b, contains a D1B data field which continues the data for record 1, and in addition several MI bytes. Sector 33c is shown broken into several fields, including D1C, which completes the data field for one record. Other fields on sector 33c include C2 which is a COUNT field for record 2, K2 which is a key field for record 2, and D2A which begins a data field for record 2. Finally, in sector 33d, field D2B, completes the data field for record 2. PAD or fill-in bytes are required to complete sector 33d, when there are no more records to be added.

Track Format Descriptors (TFDs)

Since the CKD architecture restricts the unit of transfer from disk to cache to one or more records, and since the records typically vary in length, the unit of allocation in cache is the disk track and the boundaries are defined as the initial point or start of tracks. Since tracks typically contain many records, true cache staging involves movement of much more data than is needed to determine the format. This leads to poor performance and sensitivity to low hit ratios. Thus, according to the objectives of the present invention, the control unit 14 is provided with a module of control unit logic 13 which in a preferred embodiment is programmed to provide Track Format Descriptors (TFDs) which are structures which describe the format of a CKD emulated track, such as track 32, without the need for the data content of the track to be resident in cache, or electronic memory. Of course, logic 13 could be implemented in hardware digital circuitry as well as in software, but it is preferable to implement the logic in software because of the inherent flexibility of software. The inventors' preferred embodiment is to implement the logic in the C++ programming language. For a thorough instruction on the C++ language reference may be made to B. Stroustrop, C++ *Programming Language*, 2nd Ed., AT&T Bell Labs, 1991.

There are three benefits derived directly from creating Track Format Descriptors. The first benefit is that there is not a need to take up limited cache memory with an entire data content of a track. Significantly this is achieved with a structure that is only 4 bytes in length for each track on the device. This is approximately 32 to 62 times smaller a storage requirement than prior art techniques described above. The second benefit is that a "fast write" operation can be accomplished for data tracks that are not resident in cache. Fast write operations improve system performance by allowing the host, such as host 12, to write data to cache memory, such as cache 17, and disconnect from a control unit, such as unit 14, before the data is actually written to disk, such as disk 21. This allows the host to service other activities within network 10 over I/O channel 19. The third benefit is that records can be located without having to stage the entire track of data into cache.

CCW Chain used to Construct COUNT Field

Referring to FIG. 1, a typical request to Write data in an IBM 390 environment, according to CKD architecture may be represented by the following Command Channel Word (CCW) chain, which would be relayed from host 12 to I/O channel 19:

(a) SEEK BB CC HH;

(b) SET FILE MASK (one byte parameter);

(c) SET SECTOR (one byte parameter);

(d) SEARCH ID CCHHR;

(e) TRANSFER IN CHANNEL;

(f) WRITE COUNT, KEY, DATA.

In line (a) the CCW directs the control unit to control an actual physical device, i.e. move an actuator, BB, to position a particular head, HH, on a specific cylinder number, CC. The BB field is a two byte description for selecting a particular actuator, since older disk drives had several actuators. In modern technology, an actuator equates to a volume of data, such as volume 30v. The CC parameter and the HH parameter in CKD architecture is used to select the location on a particular medium where a search for a data record is to take place. In line (b), a one byte parameter, for example, the home address (HA), is used to serve as a flag to the control unit, such as control unit 14, to control reading or writing of data. In this example, the home address (HA) is protected from overwriting, since the WRITE command is the ultimate result of this example CCW chain. In line (c), the SET SECTOR function serves to specify an angular position of a disk, such as disk 21. The SEARCH ID CCW, shown in line (d), is used to identify the record being read or written. Although CKD format provides flexibility to use any chosen parameter to identify a SEARCH field as long as there is a matching field on the disk medium, the convention that has evolved over time is that the SEARCH ID field is almost always CCHHR, the cylinder number, head number, and record number. Thus, the inventors have recognized that this information can be extracted to construct a COUNT field with minimal risk of error, but of course such error checking is recommended and methods for doing so are disclosed in this specification. By extracting this information, it is not necessary to keep the CCHHR field in high speed electronic memory, such as cache memory. Thus, five bytes of data are constructed only as needed, that is upon a SEEK or SEARCH command and therefore it is not necessary to store such information for tracks of CKD data stored on FBA devices. Of course, it can be readily appreciated that such a savings is significant when calculated for 50,000 tracks over 64 devices, for electronic cache memory, such as memory 17, for every device in a network, such as network 10. In line (e), the TRANSFER IN CHANNEL CCW is used to repeat the compare of the CCHHR field in line (d) to that in the actual COUNT field for the record. This command is not actually executed with an FBA device; however, the host 12 must be notified through I/O channel 19 that the command has been successfully completed or logic 13 will induce an error state. Finally in line (f), a WRITE command adds another record to disk. At this point, according to the present invention, control logic 13 in control unit 14 builds a data structure, denominated as "Track Format Descriptors", if the WRITE is a first write (FORMAT WRITE) to disk, or otherwise updates the Track Format Descriptors to reflect an added record.

Referring to FIG. 1, a Track Format Descriptor (TFD) forms a representation of the format according to the following general procedure. A Track Format Descriptor is initially created following a "FORMAT WRITE" CCW which sets up the actual COUNT field for CKD data. Generally, if the format is recognized by logic 13 as a "well behaved format", i.e., one that has known characteristics, then a track format descriptor is created by logic 13 to represent the format. A well behaved format has the following characteristics, there is no key field, each record on the track has the same data length, record numbers other than Record 0, R0, start at ordinal number one and increment by one. Generally, if the format is not "well behaved" but fits a pattern that is used repetitively, then a track format descriptor may be created for such a format, denominated as a "predefined format". If the format is not "well behaved" and the format has not been predefined, then the entire data track must be loaded into cache memory, before a fast write operation is performed. Although, loading the entire data track into memory is the prior art technique, the present invention yields the substantial advantage of checking for the ability to create a Track Format Descriptor before performing a plurality of fast write operations.

Preferred Data Structure of Track Format Descriptor

Preferably, the fields in a Track Format Descriptor for each track on a volume are a number_of_records field, a tfd_format field, a format_variant field, and a eof_record field. The following table shows the data structure for a preferred embodiment of a Track Format Descriptor:

TABLE 1

DATA STRUCTURE OF Track Format Descriptor

| Field | | Description |
|---|---|---|
| 1. | number_of_records (bits 0–6) | 0–126<br>127 - invalid format descriptor |
| 2. | tfd_format (bit 7) | 0 - an index to a Track Specification (predefined track format)<br>1 - the length of the data field of each record on the track ("well-behaved" track format) |
| 3. | format_variant_field (bits 8–23) | tfd_format: 0,<br>Track_Specification Index<br>tfd_format: 1,<br>Length of the data field for all records on the track<br>0–65534<br>65535 - track format escape |
| 4. | eof_record (bit 24) | TRUE<br>FALSE |

The number_of_ records field, Table 1, line 1, indicates the number of user-defined records on the track. An invalid format descriptor in the number_ of_ records field denotes to the logic 13 that the track must be staged to determine the format. Subsequent fields in the Track Format Descriptor are not considered valid. The Track Format Descriptor is then rebuilt when the track is staged into cache. The tfd_format (bit 7), Table 1, line 2, indicates how to interpret the format_variant_field (bits 8–23), Table 1, line 3, in the Track Format Descriptor. If the tfd_format signals that the track of interest has a predefined track format, indicated for example by a nominal value of "0", then the format_ variant_field provides an index to the track_specification_ field to determine the format of the record. On the other hand, if the tfd_format signals "well-behaved" track format, indicated for example by a nominal value of "1", then the format_variant field indicates the length of the data field for all records on the track. The key field must be zero in order for the track to be considered "well-behaved". A "track format" escape is used to flag that the track is neither a predefined or well-behaved format, and indicates that the track must be staged in order for the format to be determined. Subsequent fields, following a track format escape indicator, in a Track Format Descriptor are not considered valid. The eof_record field (bit 24) is set to a nominal value of "1" or "0" to indicate "TRUE" or "FALSE" as to whether the track contains an end-of-file record.

Note, the track format descriptor advantage over the prior art in terms of storage required. Since 4 bytes are required for each track, if there are 64 devices with 50,000 tracks per device as in the above example of an IBM device, then the total requirement is 12.8 megabytes. Compare this to the '939 patent technique requiring 409.6 megabytes in an identical environment.

Preferred Data Structure of Track Specification

Preferably, the fields in the Track Specification are a total_subslots field, and a record_list field. A subslot is equivalent to a physical sector on an FBA device. The track specification is only needed for the unusual situation of a track which is not in well-behaved format. Even though a plurality of tracks may fall into the predefined format category, the inventors have recognized that a single track specification indexed in a format_variant_field of a Track Format Descriptor can be used to refer to the plurality of tracks. Thus, the Track Specification can be employed in a fashion which takes minimal storage space in memory. The following table shows the data structure for a preferred example of a Track specification.

TABLE 2

TRACK SPECIFICATION

| Field | | Description |
|---|---|---|
| 1. | total_subslots | # subslots required to stage all records on the track |
| 2. | record_list | Record_Specifications |

Referring to FIG. 3 and Table 2, the total_subslots field, table 2, line 1, indicates the number of subslots of the FBA device required to stage all records on the track into cache memory. On an FBA device, a subslot is equivalent to a physical sector, such as sector 33a shown in FIG. 3. A slot is a contiguous set of subslots that contain the track data. A subpartition is the set of slots that make up the tracks on a volume. Thus, the total_subslots, or number of subslots required to stage the records may be less than the total number of subslots in the slot, as defined for the subpartition. The record_list field, Table 2, line 2, contains a list of Record_Specifications. Each Record-Specification defines a record on the track. The list is ordered according to the ordinal number of the record, for example, the first record_ specification in the list is for that record on the track having ordinal value 1. As in Track Specifications, one Record Specification data structure indexed by Record_ Specifications values in the record___list field may serve to identify a plurality of tracks. Thus, storage space required for predefined format information is kept very small.

Preferred Data Structure of Record Specification

The Record Specification describes user defined records on a track, not including Record zero (R0) and the end-of-file record. Record zero, R0, in CKD is reserved for control purposes and not available to user data. All tracks will have a standard R0 and if the end-of-file indicator in the Track Format Descriptor is set, then the last user-defined record on the track is an end-of-file record. In such a case, no new records may be added to the track. The following table shows the data structure for a preferred example of a Record Specification:

TABLE 3

RECORD SPECIFICATION

| Field | Description |
| --- | --- |
| 1. record_number | from COUNT field |
| 2. key_area_length | from COUNT field |
| 3. data_area_length | from COUNT field |
| 4. cell_number | record starting cell number |
| 5. subslot_offset | offet to subslot in which records start |

The record_number field, Table 3, line 1, is extracted by logic 13 from the actual COUNT field of the CKD data. The first record number on a track is not restricted to the ordinal value one, nor is it necessary to increment each succeeding record by one. The key area length, line 2, is taken directly from the key length indicated in the actual COUNT field of the CKD data and similarly the data_area_length, line 3, is taken directly from data length indicated in the actual COUNT field. The cell_number, line 4, is the number of the cell in which the record starts, where a cell is a subdivision of a CKD sector on an IBM 3390 device. The subslot_offset field, line 5, is the offset to the FBA subslot in which the record starts. The offset is preferably measured from the, beginning of the FBA slot. All of the above fields are preferably created by logic 13 following a "FORMAT WRITE" of the data, enacted by a host CCW.

Initially, a track contains only a standard record 0 (R0). The Track Format Descriptor for a track having only R0 indicates that there are no user-defined records and the format is set to a mode indicating that this is the case. This is accomplished by setting the number_of_records field to the value of zero. However, when records are added by the user to the data track through write operations, the number_of_records field is updated and the format of the data track is compared against predefined formats. As described above, if there is a match, the tfd_format is set to an indicating value, such as "0", and the format_variant_field should be used to reference the appropriate Track Specification. On the other hand, and as described above, if the format of the track does not match a predefined format, but is a well behaved format, then the tfd_format indicator is set to an indicating value, such as "1", and the format_variant_field is preferably set to the length of the data field of the track.

The Record Specifications are also used to store the offset of the physical sector (subslot) in which the record starts, on the FBA device. This is used for partial track staging of slots. A partial track stage is specified as the offset to the starting subslot, found in the Record Specification of the first record staged and the number of subslots to be staged. The number of subslots to stage can be found by the following mathematical relationship:

$$NSS = TS_{ts} - SO_{rs}$$

where NSS is the number of subslots to be staged, $TS_{ts}$ is the Total_subslots from Track Specification, and $SO_{rs}$ is the Subslot_offset from the Record Specification of the first record to transfer. For well-behaved track formats, the starting sector or subslot offset is calculated from the previous records on the track.

For some tracks, a stage of the entire track is required in order to determine the track information. This may be the case if the track format is not predefined to logic 13 in the control unit 14 nor is the track format well behaved, a Track Format Descriptor is not present in cache (i.e., a "miss"), or the Track Format Descriptor is lost due to a device or software error in network 10. Given the large number of possible track formats, it is not possible to describe all formats by Track Format Descriptors. In this case, the entire track must be staged in order for a write to occur. However, the present invention enables the careful determination of whether it is possible to build a Track Format Descriptor without indiscriminately loading the entire data track into cache memory.

Preferred Data Structure of Cylinder Descriptor

A Cylinder Descriptor may be necessary in the case where a cylinder number in any COUNT field on the volume is not the same as the physical address of the track. Cylinder descriptors are only created for the rare case, where the physical address and the logical address for the cylinder number, CC do not match, for example for volumes formatted by the VM operating system. Cylinder Descriptors are created for each cylinder on a volume when the first track is formatted with a record whose cylinder number is not defined as a physical address (PA). When the first user-defined record is witten on a track, the cylinder number in the record ID is compared against the cylinder number in the descriptor. If there is a match, the bit corresponding to the track is set in a bit mask. If the cylinder number in the record IDs of subsequent records on the track do not match the cylinder number in the descriptor, the track bit in the bit mask is reset. A track containing record IDs that have different cylinder numbers must be staged into cache memory to perform a search. It should be noted that this 4 byte parameter is seldom needed so there is minimal impact to memory overhead. If the cylinder descriptor is needed, it only consumes 1/15 the size of a track format descriptor, because there are typically 15 tracks per cylinder (i.e., cylinder descriptor maximum size=4×64×50000/15=853 KB). The cylinder descriptor data structure is indexed to another data structure called a Volume Specification, which indicates if a cylinder descriptor is required for a particular volume. The preferred data structure for such an exemplary Cylinder Descriptor is shown in the following table:

TABLE 4

CYLINDER DESCRIPTOR

| Field | Description |
| --- | --- |
| 1. track_bit_mask (bits 0–14) | TRUE FALSE |
| 2. (bit 15) | Preferred that this bit remain unused |
| 3. cylinder_number (bits 16–31) | Cylinder number for the cylinder |

The track_bit_mask (bits 0–14), Table 4, line 1, is a bit mask used to indicate the cylinder location of a particular track. For example, bit zero may represent track 0, bit 1 may represent track 1, and so forth. A nominal value of "1" or "0" may indicate "TRUE" or "FALSE", then the cylinder number in the COUNT fields of the track will be the value which is specified in the cylinder_number field, shown at line: 3. The cylinder_number may be the physical address of the cylinder, however, if the bit indicates "FALSE", then this indicates the cylinder number of the track is different from previous tracks in the cylinder. In this case the entire track must be staged into CACHE memory.

Preferred Data Structure of Volume Specification

A Volume Specification contains attributes of the volume. It is needed to indicate if Cylinder Descriptors exist for a volume. The volume specification is a 4 bit data structure, that is needed for each volume. In a typical environment this will be the number of disk drives, which would be 64 if using the example from above. Thus, the overall storage requirement would be only 32 bytes for an entire network 10. The preferred data structure for such an exemplary volume specification structure is shown in the following table:

TABLE 5

VOLUME SPECIFICATION

| Field | Description |
| --- | --- |
| 1. tfd_initialized | Indicates whether the TFDs are created for the volume<br>TRUE<br>FALSE |
| 2. cylinder_is_pa | TRUE<br>FALSE |
| 3. tfd_in_cache | TRUE<br>FALSE |
| 4. tfd_rebuild_in_progress | TRUE<br>FALSE |

The tfd_initialized field, Table 5, line 1, is used to indicate whether or not Track Format Descriptors have been created for a particular volume. The cylinder_ is_pa field, line 2, is used to indicate whether the cylinder number in all the record IDs on a particular volume references the physical address of the track. Recall, that for CKD data, each record contains a COUNT field that contains the record ID. Preferably, in the present invention, the record ID is used to indicate the fixed block device address. Thus the record ID contains the cylinder number (CC), head number (HH), and record number (R). If this field indicates "TRUE", then the record ID cylinder number references the physical address (PA) cylinder number of the track. If this field indicates "FALSE", then a separate cylinder descriptor structure is needed for each cylinder on the volume. The tfd_in_cache field, line 3, is used to indicate whether the Track Format Descriptor for a particular volume is currently resident in electronic cache memory. It is recommended that if the indicator is "TRUE" immediately following the power-on of control unit 14, that this be treated as an error, similar to an invalid format descriptor error. (See Table 1, line 1) In this case, the track should be staged and a Track Format Descriptor rebuilt. The tfd_rebuild_ in_ progress, line 4, is used to indicate if the Track Format Descriptors are being rebuilt, such as in the scenario just described.

Overview of COUNT Construction using Track Format Descriptor Data Structures

Figure 4:
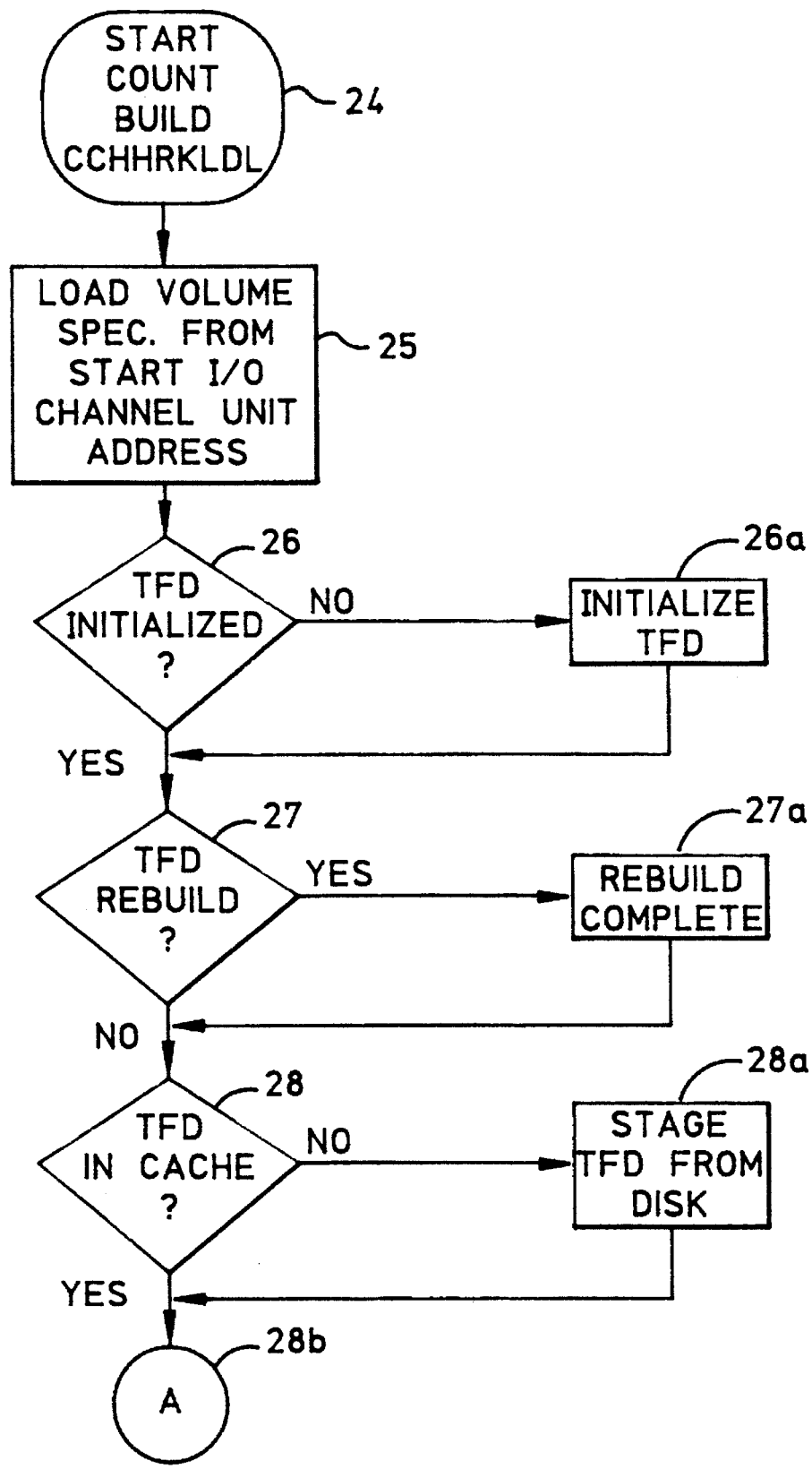
FIGS. 4 and 5 are simplified flow charts showing an overview of the operation of the illustrated system shown in FIG. 1.
Figure 5:
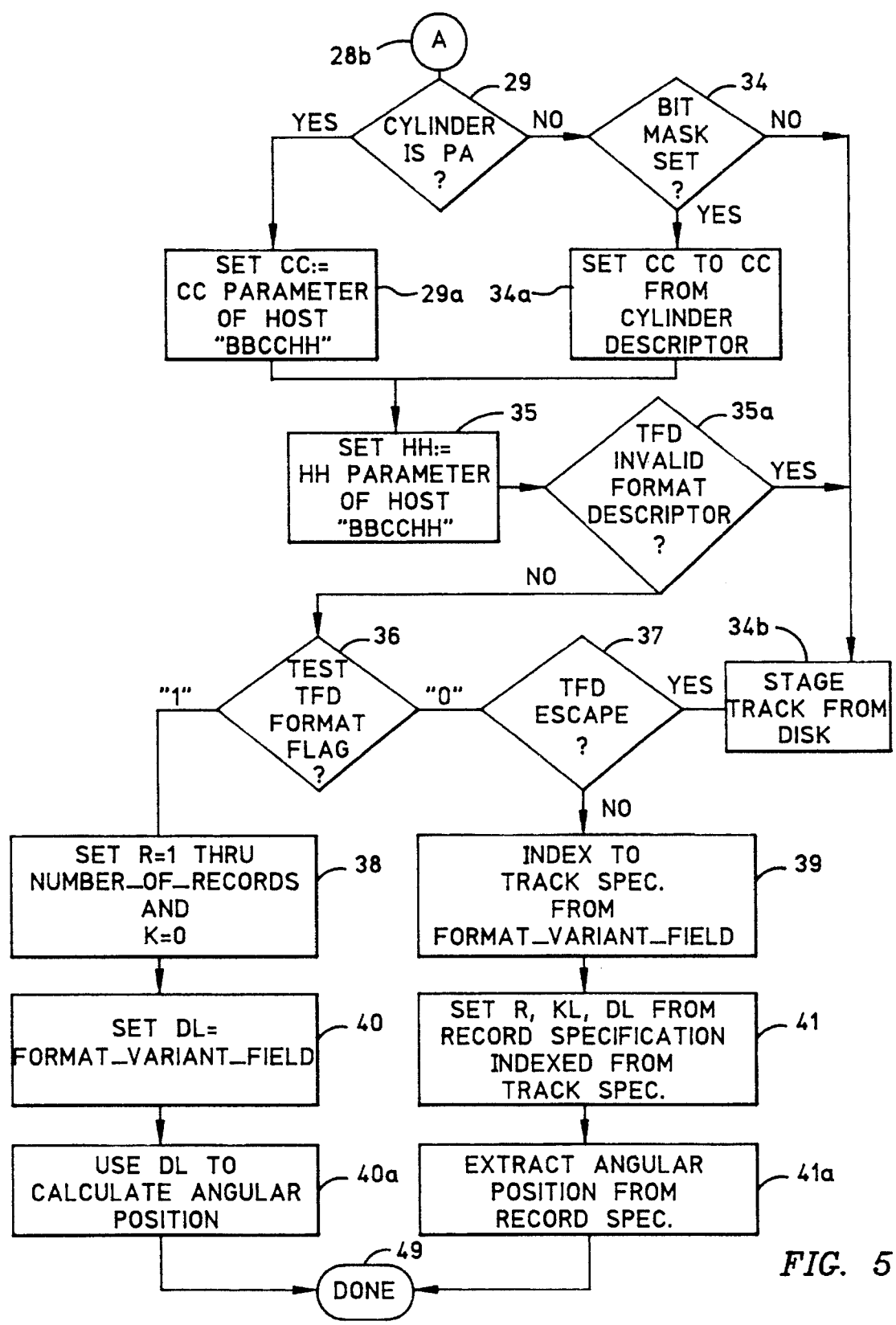

Referring to FIGS. 4 and 5, and Tables 1, 4 and 5, a simplified overview of the method of implementing the above data structures is shown. Step 24 denotes the starting of the process to construct an emulated COUNT field needed for CKD emulation, without having the track containing data records stored in memory. The process is implicitly started by the I/O Channel CCW, "SEEK BB CC HH", described above. First, it is necessary for logic 13 to access the Volume Specification data structure, which can be stored in high speed electronic memory for fast access. The process is implicitly started by an I/O channel command, start I/O unit address, where the unit address indicates the volume to be accessed. The volume identified by the unit address is then used to access a corresponding Volume Specification. The Volume Specification structure is checked to determine if Track Format Descriptors have been created for this particular volume (step 26). This is done by checking the tfd_initialized field (Table 5, line 1). If the answer is no, then the Track Format Descriptor must be initialized (step 26a). If the answer is yes, then step 27 is performed, wherein logic 13 checks to see if the Track Format Descriptor is being rebuilt, by checking the "TRUE" of "FALSE" indication of the tfd_rebuild_in_progress field (Table 5, line 4). Otherwise, the Track Format Descriptor is rebuilt by logic 13 (step 27a). The Track Format Descriptor in normal operation may be swapped from cache to disk, so it is necessary to check to see if the structure is in cache, as shown in step 28. If the Track Format Descriptor for the particular volume is not in cache, then it must be staged from disk (step 28a). If the Track Format Descriptor is in cache, then processing continues through the continuation block marked A, in step 28b, and then to step 29. Referring now to FIG. 5, the cylinder_is_pa field (Table 5, line 1) is checked, in step 29, to determine if the CC (cylinder number) address may be constructed from the CC parameter in the SEEK command of the CCW chain described above, or if the track must be staged from disk, or if the CC address must be obtained from the Cylinder Descriptor data structure. This can be seen by referring once again to step 29, if the cylinder_ is_ pa field is set to "TRUE", then the CC address is constructed by logic from the CC parameter in the CCW, "SEEK BB CC HH". However if the cylinder_is_ pa field is set to "FALSE", then processing continues in step 34. In step 34, the track_bit_mask in the Cylinder Descriptor structure (Table 4, line 1) is checked. If the track_bit_mask is "TRUE" then this indicates that CC address for determining the cylinder number is also described in the Cylinder Descriptor Structure and is designated as the cylinder_ number field (Table 4, line 3). Thus, in step 34a, the CC address for the constructed COUNT field is set from the cylinder_number field in the Cylinder Descriptor structure. The head number, HH, parameter for the constructed COUNT field is derived from the HH parameter in the CCW, "SEEK BB CC HH" (step 35). In step 35a, if the number of records field in the track format descriptor indicates an invalid format descriptor, then the track is loaded from the FBA device. Otherwise processing continues to step 36, described below.

Referring again to FIG. 5 and also to Tables 1, 2, and 3, once the CC and HH fields are constructed, it is still necessary for the control unit 14 to know the number of records, whether or not there is a key field, and the data length in order to emulate CKD data read and write operations, and in particular to perform a "fast write" operation. Thus, in step 36, logic 13 checks the format as indicated in the 4 byte Track Format Descriptor structure. The tfd_ format field (Table 1, line 2) is checked to determine if it is nominally "0", indicating a predefined track format, or "1" which indicates a well behaved track format. If a well behaved format is indicated, then processing continues to step 38. Since a well behaved format, by definition, always begins with R0, followed by user records beginning at ordinal number one, the value for R is set to 0 through a value indicated in the number_ of_records field (Table 1, line 1). Also in step 38, the value for the Key Length field is set to zero (KL=0), since a well behaved format has no key field. The DL field for the COUNT field is obtained from the format_variant_field (Table 1, line 3). It has been observed by the inventors, that the well behaved format is, by far, the most frequently occurring format found in typical CKD data storage environments. Thus, the 4 byte field for the Track Descriptor Function is typically all that is needed to deal with a read or fast write operation. To be prepared for the unusual situation, processing moves from step 36 to step 37 if the tfd_format is a nominal value 0, where the format_variant_field is checked to see if a "escape" is indicated. If the answer is yes, the track must be staged from disk. However, if there is no escape, then processing continues to step 39. In this case, where the tfd_format field indicates a nominal value "0" and there is no escape warranted, then the description of the format for such a predefined, is preferably derived by an index or pointer mechanism such as a linked list pointing mechanism to the Track Specification (Table 2) by ascertaining the index into the Track Specification structure given as the value of the format_variant field. Processing continues to step 41, where the R, K, and DL fields are constructed from the Record Specification structure (Table 3) indexed by the record_list field (Table 2, line 2) in the Track Specification structure. Recall, the Record Specification (Table 3) structure contains the actual values from a COUNT field as commanded during a host "FORMAT WRITE" CCW. When the DL field is specified in either step 40 or 41, then the processing to determine the COUNT field is complete (step 49).

More information may be required beyond the COUNT field information if the host 12 has requested a record by its angular position on a CKD type device. If a record located at a specific CKD angular position has been requested by the host, instead of a record denoted by a search ID, then it will be necessary to determine what record is located at the requested angular position. This will be the case when host 12 commands the following CCW, "SET SECTOR (1 byte parameter)", where the 1 byte parameter specifies the desired angular setting of an actual CKD formatted disk, instead of the CCW, "SEARCH ID= CCHH R", where R is a record identifier. Thus, in step 40A, the data length field can be used to calculate an angular position for a well behaved track format, since the data lengths are always equal in that case. The predefined case is shown in step 41A, where the angular position can be translated by determining the CKD cell_number field in the Record Specification, and the subslot_offset for translating to an FBA device.

COUNT Field: Well Behaved Format

For the sake of clarity, the following table summarizes a constructed COUNT field for "Well Behaved" Track Format, according to the present invention. The COUNT field for "well behaved" track formats is constructed as follows:

TABLE 6

COUNT FIELD CONSTRUCTION FOR
WELL-BEHAVED TRACK FORMATS

| COUNT Field | Description |
| --- | --- |
| 1. CC - Cylinder number | The cylinder number is the Physical Address (PA) if the cylinder_is_pa indicator in the Volume Specification is set. Otherwise, the cylinder number specified in the Cylinder Descriptor is used. |
| 2. HH - Head number | The head number is always the PA. |
| 3. R - Record number | The starting record number and increment between records is one. |
| 4. K - Key length | The key length is always 0. |
| 5. DD - Data length | The data length is found in the format_variant_field in the Track Format Descriptor. |

COUNT Field Predefined Format

For the sake of clarity, the following table summarizes a constructed COUNT field is constructed for Predefined Track Format, according to the present invention. The COUNT field for predefined track formats is constructed as follows:

TABLE 7

COUNT FIELD CONSTRUCTION FOR
PREDEFINED TRACK FORMATS

| COUNT Field | Description |
| --- | --- |
| 1. CC - Cylinder number | The cylinder number is the Physical Address (PA) if the cylinder_is_pa indicator in the Volume Specification is set. Otherwise, the cylinder number specified in the Cylinder Descriptor is used. |
| 2. HH - Head number | The head number is always the PA. |
| 3. R - Record number | The record number is found in the record_number field in the Record Specification. |
| 4. K - Key length | The key length is found in the key_area_length field in the Record Specification. |
| 5. DD - Data length | The data length is found in the data_area_length field in the Record Specification |

Use of Constructed Count Fields in CKD Emulation

Figure 6:
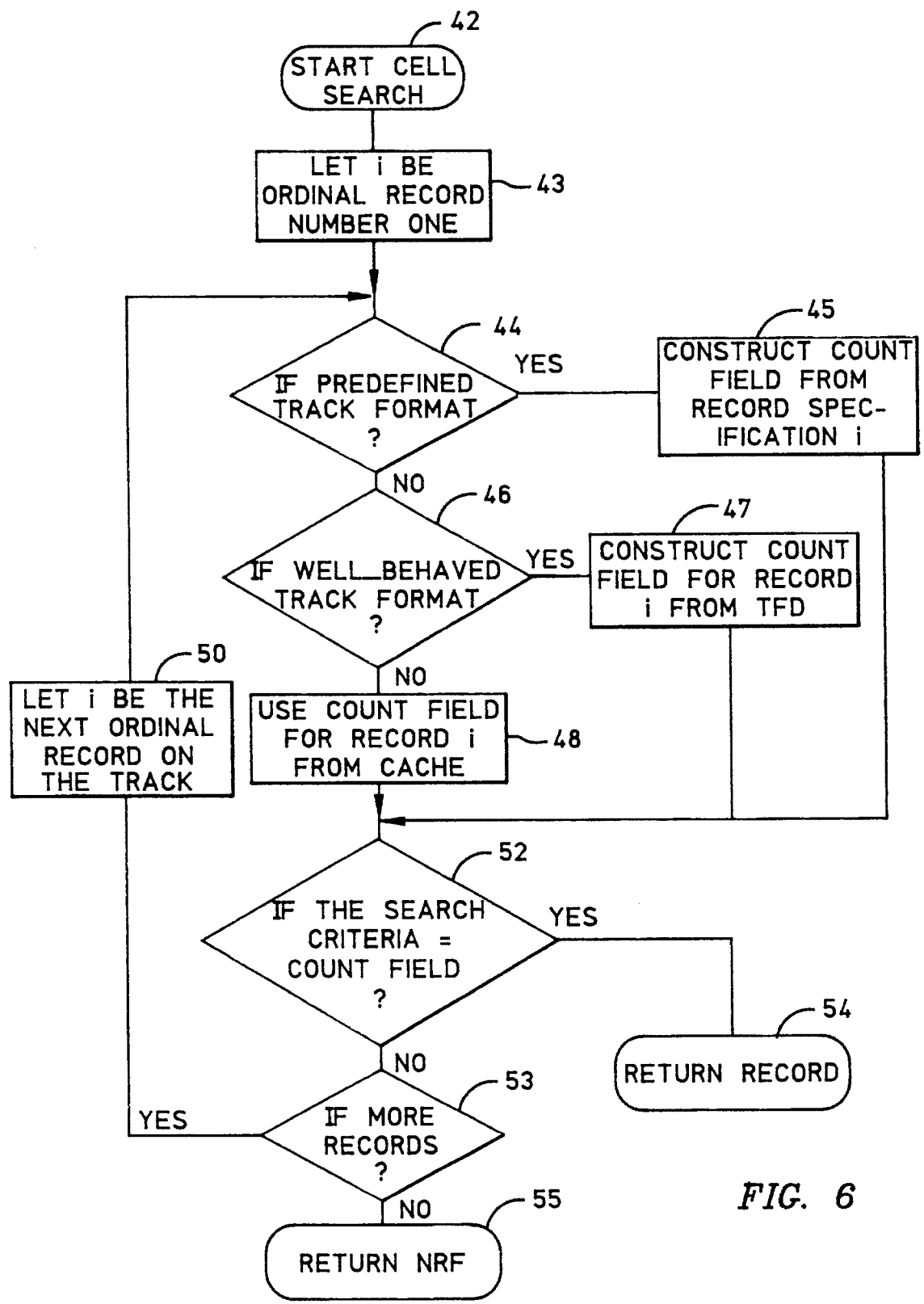
FIG. 6 is a simplified flow chart showing an overview of particular operations shown in FIGS. 4 and 5.

The following discussion goes into more detail to better explain the invention and in particular identifies methods of using the invention. Referring to FIG. 6, a constructed COUNT field as described above in either Table 6 or Table 7 may be searched by logic 13 to emulate physically locating a record. The search is begun in step 42. A record search is performed to determine what record to read or write. The record whose record ID matches the record ID (CCHHR) search criteria is selected. The search is performed by incrementally constructing the COUNT field from the Track Format Descriptor for each record on the track and comparing it to the search criteria until the search is complete. After incrementing in step 43, the first record is checked in step 44. If the record is in predefined track format, then the COUNT field is constructed from the specification for the first record (step 45). Processing is completed sequentially in steps 52 and 54 if the search criteria is a COUNT field, by returning the record. However, if processing of step 44 determines that the track is not in predefined format then the logic 13 checks to see if the track is in "well-behaved" format (step 46). If the track meets the definition of "well behaved" as described above, then a COUNT field for record 1 is created by the logic 13 in the control unit 14. If the track field is not "well behaved" then the track is staged into cache memory and the actual COUNT field for record 1 is extracted from the data track (step 48). If the search criteria is other than COUNT field and there are more records (steps 52 and 53), then the next record is checked and processing returns to step 44, after the increment step 50. If there are no more records to check, and the search criteria for COUNT field is never satisfied then an error message indicating no record found (NRF) is returned to the Control unit 14.

Figure 7:
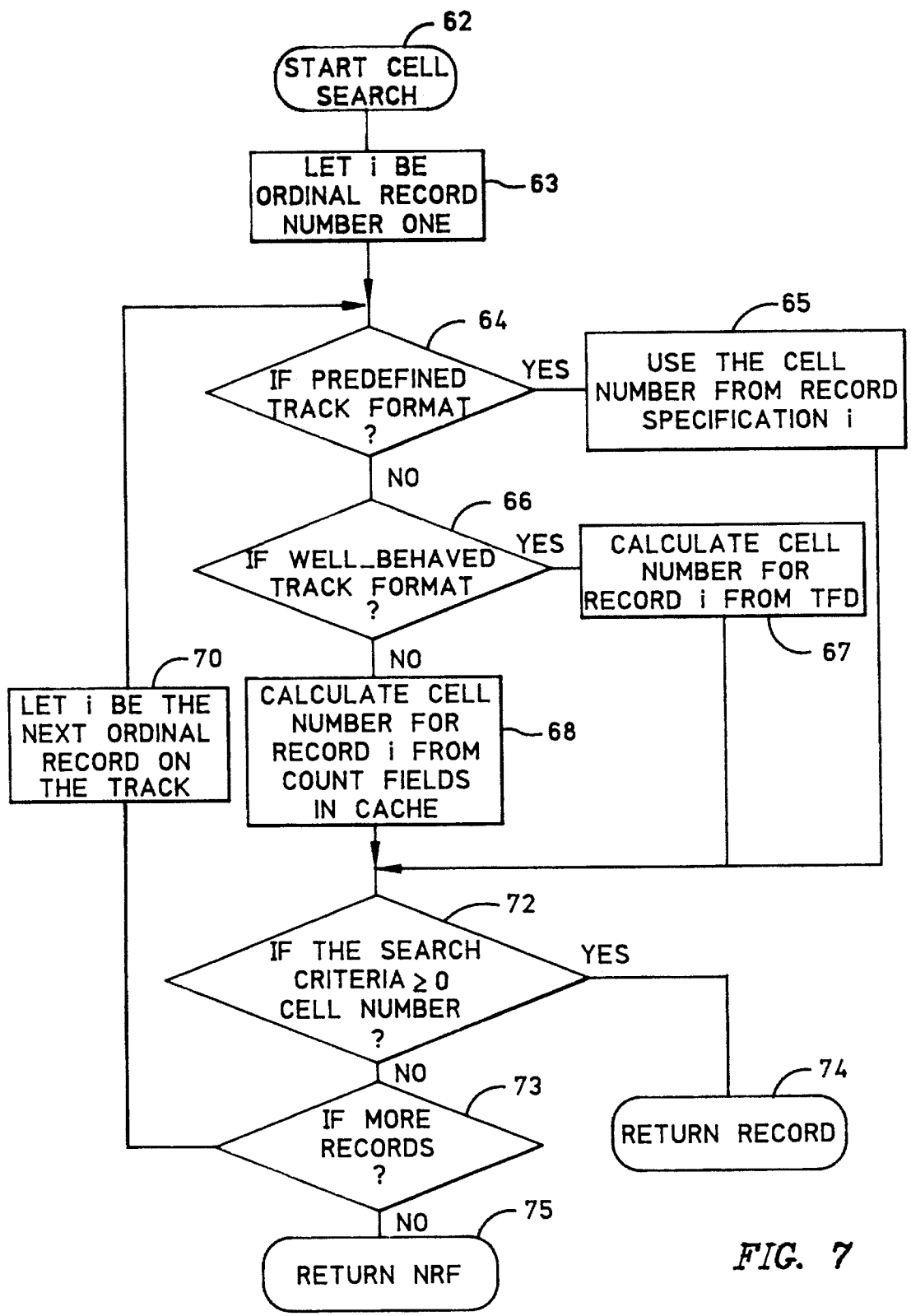
FIG. 7 is another simplified flow chart showing an overview of other particular operations shown in FIGS. 4 and 5.

Referring to FIG. 7, and Table 3, another advantageous use for Track Format Descriptors is shown, and specifically this involves a host specified "SET SECTOR FUNCTION". This function emulates rotating a physical disk medium as prescribed by the CCW, "SET SECTOR (1 byte parameter)" argument, where the 1 byte parameter indicates the desired angular setting. This involves converting an angular position to a record number because the HOST CCW does not specify a CCHHR address. Although the CCHH is identified in a "SEEK" command, the identifier "R" is not given. Therefore, the angular position given is the only way to locate the record. This CKD command must be translated to relate to an FBA device. The present invention provides a Record Specification data structure which may be used to accomplish this function, without the need to load the emulated CKD track into cache memory. In this case it is necessary to specify fields from a typical CKD COUNT field that are not typically emulated for FBA devices. The specified fields include the "cell number", which can be found in the Record Specification data structure (Table 3, line 4). This associated cell number is compared with either the precalculated cell number in the Record Specification for predefined track formats or the calculated cell number for the records of "well behaved" track formats. Generally, the first record whose cell number is equal to or greater than the search criteria is selected. The function begins in step 62, and the record number is set to one in step 63. The first record is checked in step 64 for a predefined or well behaved format. If the record is in predefined track format, then the cell number is retrieved from the Record Specification for record 1 (step 65). Processing is completed sequentially in steps 72 and 74, if the search criteria is satisfied by a value greater than or equal to the cell number, then logic 13 ends the process by returning the record as the next record to be processed. However, if processing of step 64 determines that the track is not in predefined format then the logic 13 checks to see if the track is in "well-behaved" format (step 66). If the track meets "well behaved" criteria then a cell number for record 1 is calculated by the logic 13 in the control unit 14. If the track field is not "well behaved" and it already has been determined that the track is not predefined either, then the track is staged into cache memory and the cell number is calculated for record 1 from the COUNT fields in cache (step 68). If the search criteria is not satisfied by a value greater than or equal to the cell number, and there are no more records (steps 72 and 73), then the next record is checked and processing would return to step 64, after incrementing in step 70. If there are no more records to check, and the search criteria for cell number is never satisfied, then an error message indicating no record found (NRF) is returned indicating that processing should continue from data record (R1) (Step 75).

Figure 8:
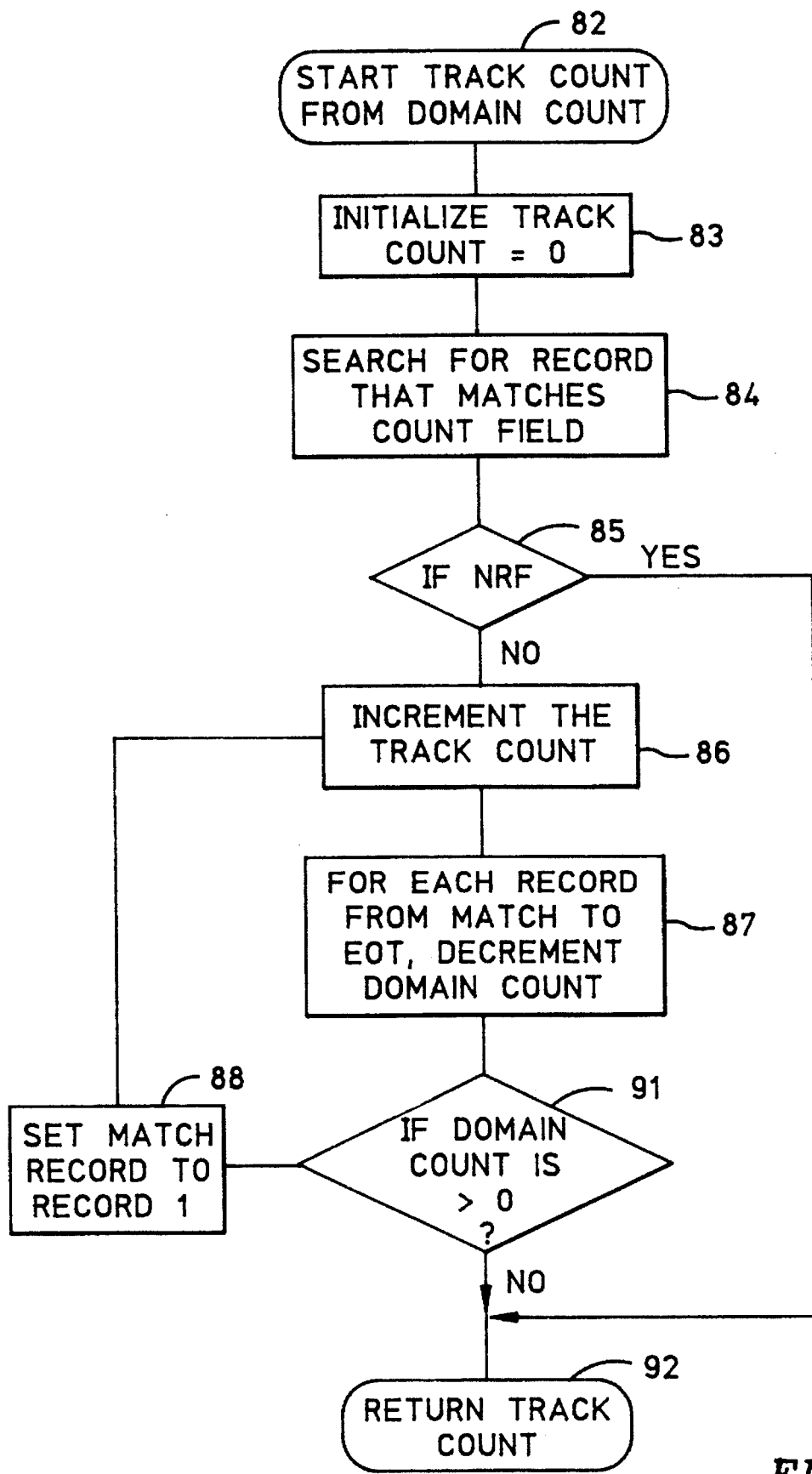
FIG. 8 is another simplified flow chart showing an advantageous use of the present invention.

Referring to FIG. 8, the application of a LOCATE RECORD CKD command with the present invention is shown. The LOCATE RECORD command is a known command used in the IBM 390 I/O architecture. The LOCATE RECORD command as used by IBM has many parameters. As used in the present invention, the LOCATE RECORD command creates an operational domain, the domain indicating a number of records to be searched. The LOCATE RECORD CKD command specifies how many records or tracks to operate on, and, in turn, determines how much cache is required, thus improving the probability of obtaining a hit on a read or write operation. The number_ of_ records field in the Track Format Descriptor is used to determine how many tracks are required to satisfy the LOCATE RECORD command. The hit ratio is improved, because the control unit logic 13 may prestage or preload the tracks if necessary. To determine the number of tracks, the logic 13 employs the "SEARCH CCHHR" fields of the LOCATE RECORD command. The number of records is calculated by subtracting the records present between the Search Record and the End of the Track. This number may be offset by one depending on the orientation of the last command and the required orientation of the LOCATE RECORD command. For each subsequent track, the Track Format Descriptor number_of_records field value is subtracted from the domain count. The number of tracks from the search track to a track whose number_of_records value, results in the domain count being reduced to zero or less is the number that is required to satisfy the domain parameter of the LOCATE RECORD command. The number_of_ records field is maintained in the Track Format Descriptor for tracks, even in the case where the format is not known to the control unit 14. The calculation procedure is shown starting in step 82. The track count is first initialized to zero (step 83). The logic 13 then executes a search for the record that matches the COUNT field (step 84). If no match occurs, processing is complete with the return of the track count (step 85 and 92). However, if a match occurs, then the track count is incremented (step 86). Then for each record from the matching search record to the end of track, the domain count is decreased (step 87). If the domain count is greater than zero than the match record is set to record 1 and the track count continues to increment (steps 91 and 86). If the domain count is not greater than zero then the track count is returned, as shown in step 92. Thus, the track format description may be used to locate a host specified record without staging the entire track into cache memory.

Since it is important to free up cache memory from unnecessary tasks, it is desirable to only store Track Format Descriptors that are likely to be needed. A corollary principle is that Track Format Descriptors which have not been used in a long time should be removed from cache. Conventional performance algorithms well-known in the art, such as the least recently used (LRU) algorithm, may be used to achieve this. Preferably, when a volume is inactive, for example, when no records have been accessed for an extended period of time, the Track Format Descriptors are stored with data on the volume itself, in order to free up cache memory. A read or write activity would then be used to trigger a staging of the Track Format Descriptor into memory. By storing the Track Format Descriptors with the data, conventional error correction and data back-up techniques such as redundant arrays of inexpensive disks (RAID) may be used to prevent loss of the Track Format Descriptors.

To further prevent against loss of Track Format Descriptors, it is preferred that the Track Format Descriptors be updated whenever the corresponding track has its data updated. This can be problematic; however, if the track data is updated while in cache memory. Typically, in a computer disk storage system, once data is distributed to cache memory, updates to the data are not recorded, instead the control unit logic, such as logic 13, waits until the data is written to disk before performing control tasks, such as updating Track Format Descriptors. Upon failure of cache memory, or an interruption of power in a typical system, modified data might be quickly written to disk as part of normal error recovery software routine (not shown). This would in effect invalidate a Track Format Descriptor because the descriptor would be out of sync with the data on the track. Therefore, it is preferred to set the format values for the tracks that were loaded into cache prior to the error event to "invalid format descriptor." Rebuilding the Track Format Descriptors could then occur as a background activity according to the methods described for either predefined or well behaved data formats. A preferred embodiment of the present invention has been described for efficiently updating of data stored on devices of fixed block architecture, without having to load the data to be updated into electronic memory; however, it should be understood that modifications and adaption thereof may occur to persons skilled in the art. Therefore, protection afforded the present invention should only be limited in accordance with the scope of the following claims.

What is claimed is:

1. In a control unit in communication with a host processor, an input/output (I/O) channel, and at least one Fixed Block Architecture (FBA) data storage device, the control unit provided with electronic memory for data storage and transfer means for bilateral communication of data between the electronic memory and the FBA storage device, a method for locating and updating a host request for a specified CKD format record stored on the FBA device, wherein the host specified CKD format record is specified according to a location on a CKD emulated track which identifies a cylinder number (CC) and a head number (HH) and is further specified by a location on an emulated CKD volume, the method comprising the unordered machine-executed steps of:

(a) storing in this electronic memory one or more Track Format Descriptors (TFDs) which describe the format of each CKD emulated track on the emulated CKD volume identified as the location of the host specified record, without storing an image of the CKD emulated track in the electronic memory;

(b) storing in this electronic memory a Volume Specification containing cylinder number information for each record in the emulated CKD volume;

(c) constructing an emulated CKD COUNT field for the CKD emulated track which is identified as the location of the host specified record, the emulated CKD COUNT field based on the host specified location, and the Volume Specification information, and further based on the description in one Track Format Descriptor (TFD) which describes the format of the CKD emulated track; and (d) locating and updating the host specified record by using the emulated CKD COUNT field in step (c).

2. The method of claim 1, wherein the constructed emulated CKD COUNT field for the CKD emulated track of step 1(c) is built by setting the CC field according to cylinder information in the Volume Specification, setting the HH field to a value identical to the HH parameter of the host specified record, and setting each of a respective record number (R) field, a key length (KL) field, and a data length (DL) field in the emulated CKD COUNT field according to information in the one TFD.

3. The method of claim 1, wherein the host specified CKD format record is identified according to a CKD format angular position and the angular position is translated to an FBA format by reference to information indexed in the one TFD of step 1(c).

4. The method of claim 2, wherein the Volume Specification cylinder information of step 1(b) has a field indicating whether each cylinder number for each record located on the CKD emulated volume is identical to a physical address of the CKD emulated track.

5. The method of claim 4, and further comprising the steps of:

setting the CC value in the emulated COUNT field of step 1(c) equal to the CC parameter of the host specified CKD format record, if the Volume Specification cylinder information of step 1(b) indicates that the cylinder number for each record on the CKD emulated volume is identical to a physical address of the CKD emulated track.

6. The method of claim 4, and further comprising the steps of:

defining a Cylinder Descriptor data structure containing a first field containing a track bit mask, wherein each bit in the mask represents a track in the emulated CKD cylinder, and a second field which contains a cylinder number which identifies the emulated CKD cylinder;

loading the Cylinder Descriptor data structure into the electronic memory, if the Volume Specification cylinder information of 1(b) indicates that the cylinder number for each record on the CKD emulated volume is not identical to a physical address of the CKD emulated track; and setting the CC field in the emulated COUNT field of step 1(c) equal to the second field of the Cylinder Descriptor containing the cylinder number, if the first field of the Cylinder Descriptor containing the track bit mask indicates that the cylinder number for the emulated CKD track is the same as other tracks represented in the track bit mask.

7. The method of claim 6, and further comprising the step of:

staging the entire emulated CKD track into electronic memory if the first field of the Cylinder Descriptor containing the track bit mask indicates that the cylinder number for the emulated CKD track is different from other tracks represented in the track bit mask, and determining format information for the CKD emulated track from the actual COUNT field of the host specified record on the CKD emulated track.

8. The method of claim 2, wherein the one TFD of step 1(c) includes a first field indicating the number of records on the emulated CKD track, a second field indicating whether the emulated CKD track format is a well behaved format or a predefined format, a third field indicating a data length of each record on the emulated CKD track if the emulated CKD track is indicated in the second field to have a well defined format, otherwise the third field indexed to a Track Specification, the Track Specification containing information describing the emulated CKD track which is indicated in the second field to have a predefined format, and a fourth field indicating whether the emulated CKD track contains an end of file record.

9. The method of claim 8, wherein step 1(c) further comprises the steps of:

responding to an indication of the one TFD that the CKD emulated track has a well behaved format by:

setting the emulated COUNT field R field to a value indicated by the number of records field in the one TFD describing the format of the CKD emulated track;

setting the KL field to zero; and setting the DL field to the data length field in the track format descriptor of the CKD emulated track.

10. The method of claim 2, wherein step 1(c) further comprises the steps of:

responding to an indication of the one TFD that the CKD emulated track has predefined format, by loading a Track Specification into the electronic memory, the Track Specification containing information about the CKD emulated track having a predefined format.

11. The method of claim 10, wherein the Track Specification has a first field describing the number of subslots required to stage all records on the CKD emulated track having a predefined format, and a second field containing a list of Record Specifications, the list of Record Specifications describing each record on the predefined format track.

12. The method of claim 11, further comprising the step of loading a Record Specification for the host specified record into the electronic memory, wherein the Record Specification for the host specified record which is referenced in the list of Record Specifications has:
- a record number field containing a value which is equal to the record number field value of the actual COUNT field of the CKD emulated track;
- a key length field containing a value which is equal to the key length field value of the actual COUNT field of the CKD emulated track;
- a data length field containing a value which is equal to the data length field value of the actual COUNT field of the CKD emulated track;
- a cell number field containing a value which is equal to the cell number field value of the actual COUNT field of the CKD emulated track; and
- a fifth field containing a value indicating the offset to a subslot in which the host specified record starts on the FBA device.

13. The method of claim 12, wherein the host specified CKD format record is identified according to a CKD format angular position and the angular position is translated to an FBA format by reference to the fourth field of the Record Specification for the host specified record for determining the angular position of the host specified record, and by reference to the fifth field of the Record Specification for the host specified record for determining the location of the host specified record on an FBA device.

14. The method of claim 12, wherein the step of responding to an indication of the one TFD that the CKD emulated track has a predefined format further comprises the steps of:
- setting the emulated COUNT field R field to the value in the record number field of the Record Specification of the host specified record;
- setting the emulated COUNT field KL field to the value in the key length field of the Record Specification of the host specified record; and
- setting the emulated COUNT field DL field to the data length field of the Record Specification of the host specified record.

15. The method of claim 9, wherein the host specified CKD format record is identified according to a CKD format angular position and the angular position is calculated by using the data length field in the one TFD describing the format of the CKD emulated track.

16. The method of claim 8, wherein step 1(c) further comprises the steps of:
- determining the format of the CKD emulated track by checking the second field of the one TFD, and if the format of the CKD emulated track is well behaved format then setting the emulated COUNT field R field to a value indicated by the number of records field in the one TFD describing the format of the CKD emulated track, and setting the KL field to zero; and setting the DD field to the data length field in the track format descriptor of the emulated track, if however; the format of the CKD emulated track is predefined then loading a Track Specification into the electronic memory, the Track Specification containing information about the CKD emulated track having a predefined format.

17. The method of claim 16, wherein the Track Specification has a first field describing the number of subslots required to stage all records on the CKD emulated track having a predefined format, and a second field containing a list of Record specifications, the list of Record specifications describing each record on the predefined format track.

18. The method of claim 17, further comprising the step of loading a Record Specification for the host specified record into the electronic memory, wherein the Record Specification for the host specified record which is referenced in the list of Record Specifications has:
- a record number field containing a value which is equal to the record number field value of the actual COUNT field of the CKD emulated track;
- a key length field containing a value which is equal to the key length field value of the actual COUNT field of the CKD emulated track;
- a data length field containing a value which is equal to the data length field value of the actual COUNT field of the CKD emulated track;
- a cell number field containing a value which is equal to the cell number field value of the actual COUNT field of the CKD emulated track; and
- a fifth field containing a value indicating the offset to a subslot in which the host specified record starts on the FBA device.

19. The method of claim 18, wherein the host specified CKD format record is identified according to a CKD format angular position and the angular position is translated to an FBA format by reference to the fourth field of the Record Specification for the host specified record for determining the angular position of the host specified record, and by reference to the fifth field of the Record Specification for the host specified record for determining the location of the host specified record en an FBA device.

20. The method of claim 17, wherein the step of responding to an indication of the one TFD of step 1(c) that the CKD emulated track has a predefined format further comprises the steps of:
- setting the emulated COUNT field R field to the value in the record number field of the Record Specification of the host specified record;
- setting the emulated COUNT field KL field to the value in the key length field of the Record Specification of the host specified record; and
- setting the emulated COUNT field DL field to the data length field of the Record Specification of the host specified record.

21. The method of claim 16, wherein if it is determined that the format of the data on the track is neither well behaved nor in a predefined format, then loading the entire data on the track into cache memory, and determining format information from the actual COUNT field of the host specified record on the CKD emulated track.

22. The method of claim 1, and further comprising the step off disconnecting the control unit I/O channel after writing update data for the host specified record into electronic memory.

23. The method of claim 1, wherein the Volume Specification data structure is created during a format write of an emulated CKD volume.

24. The method of claim 1, wherein the TFDs are created during a format write of an emulated CKD volume.

25. In a control unit in communication with a host processor, an input/output (I/O) channel, and at least one Fixed Block Architecture (FBA) data storage device, the control unit provided with electronic memory for data storage and transfer means for bilateral communication of data between the electronic memory and the FBA storage device, a method for locating and updating a host request for a specified CKD format record stored on the FBA device, wherein the host specified CKD format record is specified according to a location on a CKD emulated track which identifies a cylinder number (CC) and a head number (HH) and is further specified by a location on an emulated CKD volume, the method comprising the unordered machine-executed steps of:

(a) storing in the electronic memory one or more Track Format Descriptors (TFDs) which describe the format of each CKD emulated track on the emulated CKD volume identified as the location of the host specified record, without storing an image of the CKD emulated track in the electronic memory;

(b) storing in the electronic memory a Volume Specification containing cylinder number information for each record in the emulated CKD volume;

(c) constructing an emulated CKD COUNT field for the CKD emulated track, identified as the location of the host specified record, Specification for the host specified record which is referenced in the list of Record Specifications; and (iii) if the format of CKD emulated track is neither well behaved or predefined, staging the entire CKD emulated track into electronic memory and determining format information from the actual COUNT field of the host specified record on the CKD emulated track; and (e) locating and updating the host specified record based on the response to determine the format in step (d).

26. A control unit for locating and updating a host request for a specified CKD format record which is stored on a Fixed Block Architecture (FBA) data storage device, the control unit in communication with a host processor, an input/output (I/O) channel, and at least one Fixed Block Architecture (FBA) data storage device, the control unit provided with electronic memory for data storage and transfer means for bilateral communication of data between the electronic memory and the FBA storage device, wherein the host specified CKD format record is specified according to a location on a CKD emulated track which identifies a cylinder number (CC) and a head number (HH) and is further specified by a location on an emulated CKD volume, the control unit comprising:

(a) means for storing in the electronic memory one or more Track Format Descriptors (TFDs) which describe the format of each CKD emulated track on the emulated CKD volume identified as the location of the host specified record, without storing an image of the CKD emulated track in the electronic memory;

(b) means for storing in the electronic memory a Volume Specification containing cylinder number information for each record in the emulated CKD volume;

(c) means for constructing an emulated CKD COUNT field for the CKD emulated track, identified as the location of the host specified record, based on the host specified location and the Volume Specification information, and further based on the description in one Track Format Descriptor (TFD) which describes the format of the CKD emulated track; and (d) means for locating and updating the host specified record by using the emulated CKD COUNT field in step (c).

27. The control unit of claim 26, wherein the constructed emulated CKD COUNT field for the CKD emulated track is built by setting the CC field according to cylinder information in the Volume Specification, setting the HH field to a value identical to the HH parameter of the host specified record, and setting each of a respective record number (R) field, a key length (KL) field, and a data length (DL) field in the emulated CKD COUNT field are set according to information in the one TFD which describes the format of the CKD emulated track.

28. The control unit of claim 27, wherein the host specified CKD format record is identified according to a CKD format angular position and the angular position is translated to an FBA format by reference to information indexed in the one TFD which describes the format of the CKD emulated track.

29. The control unit of claim 28, wherein the Volume Specification cylinder information has a first field indicating whether each cylinder number for each record located on the CKD emulated volume is identical to a physical address of the CKD emulated track.

30. The control unit of claim 29, and further comprising:

means for setting the CC value in the emulated COUNT field equal to the CC parameter of the host specified CKD format record, if the Volume Specification cylinder information indicates that the cylinder number for each record on the CKD emulated volume is identical to a physical address of the CKD emulated track.

31. The control unit of claim 30, and further comprising:

means for defining a Cylinder Descriptor data structure containing a first field containing a track bit mask, wherein each bit in the mask represents a track in the emulated CKD cylinder, and a second field which contains a cylinder number which identifies the emulated CKD cylinder;

means for loading the Cylinder Descriptor data structure into the electronic memory, if the Volume Specification cylinder information of 1(b) indicates that the cylinder number for each record on the CKD emulated volume is not identical to a physical address of the CKD emulated track; and means for setting the CC field in the emulated COUNT field of step 1(c) equal to the second field of the Cylinder Descriptor containing the cylinder number, if the first field of the Cylinder Descriptor containing the track bit mask indicates that the cylinder number for the emulated CKD track is the same as other tracks represented in the track bit mask.

32. The control unit of claim 31, and further comprising the step of:

means for staging the entire emulated CKD track into electronic memory if the first field of the Cylinder Descriptor containing the track bit mask indicates that the cylinder number for the emulated CKD track is different from other tracks represented in the track bit mask, and determining format information for the CKD emulated track from the actual COUNT field of the host specified record on the CKD emulated track.

33. The control unit of claim 27, wherein the one TFD which describes the format of the CKD emulated track includes a first field indicating the number of records on the CKD emulated track, a second field indicating whether the emulated CKD track format is a well behaved format or a predefined format, a third field indicating a data length of each record on the emulated CKD track if the emulated CKD track is indicated in the second field to have a well defined format, otherwise the third field indexed to a Track Specification, the Track Specification containing information describing the emulated CKD track which is indicated in the second field to have a predefined format, and a fourth field indicating whether the emulated CKD track contains an end of file record.

34. The control unit of claim 33, and further comprising:

means for responding to an indication of the one TFD that the CKD emulated track has a well behaved format by:

setting the emulated COUNT field R field to a value indicated by the number of records field in the one TFD describing the format of the CKD emulated track;

setting the KL field to zero; and setting the DL field to the data length field in the track format descriptor of the CKD emulated track.

35. The control unit of claim 27, and further comprising:

means for responding to an indication of the one TFD that the CKD emulated track has predefined format, by loading a Track Specification into the electronic memory, the Track Specification containing information about the CKD emulated track having a predefined format.

36. The control unit of claim 35, wherein the Track Specification has a first field describing the number of subslots required to stage all records on the CKD emulated track having a predefined format, and a second field containing a list of Record Specifications, the list of Record Specifications describing each record on the predefined format track.

37. The control unit of claim 36, and further comprising means for storing the Record Specification for the host specified record into electronic memory, wherein the Record Specification for the host specified record which is referenced in the list of Record Specifications has:

a record number field containing a value which is equal to the record number field value of the actual COUNT field of the CKD emulated track;

a key length field containing a value which is equal to the key length field value of the actual COUNT field of the CKD emulated track;

a data length field containing a value which is equal to the data length field value of the actual COUNT field of the CKD emulated track;

a cell number field containing a value which is equal to the cell number field value of the actual COUNT field of the CKD emulated track; and a fifth field containing a value indicating the offset to a subslot in which the host specified record starts on the FBA device.

38. The control unit of claim 37, wherein the host specified CKD format record is identified according to a CKD format angular position and the angular position is translated to an FBA format by reference to the fourth field of the Record Specification for the host specified record for determining the angular position of the host specified record, and by reference to the fifth field of the Record Specification for the host specified record for determining the location of the host specified record on an FBA device.

39. The control unit of claim 36, and further comprising means for responding to an indication of the one TFD that the CKD emulated track has a predefined format further by:

setting the emulated COUNT field R field to the value in the record number field of the Record Specification of the host specified record;

setting the emulated COUNT field KL field to the value in the key length field of the Record Specification of the host specified record; and setting the emulated COUNT field DL field to the data length field of the Record Specification of the host specified record.

* * * * *